(12) United States Patent
Liu

(10) Patent No.: US 8,054,738 B2
(45) Date of Patent: Nov. 8, 2011

(54) TOUCH PANEL, METHOD FOR DRIVING SAME, AND DISPLAY DEVICE USING THE SAME

(75) Inventor: Xian-Jie Liu, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 663 days.

(21) Appl. No.: 12/286,695

(22) Filed: Sep. 30, 2008

(65) Prior Publication Data

US 2009/0096766 A1    Apr. 16, 2009

(30) Foreign Application Priority Data

Oct. 12, 2007   (CN) .......................... 2007 1 0123926

(51) Int. Cl.
*G09G 3/00* (2006.01)
(52) U.S. Cl. ...................... 369/173; 178/18.01
(58) Field of Classification Search .................. 345/173, 345/174, 12, 175, 104, 204, 156; 178/18.01, 178/18.03, 18.05
See application file for complete search history.

(56) References Cited

U.S. PATENT DOCUMENTS

| | | | | |
|---|---|---|---|---|
| 6,246,394 | B1 * | 6/2001 | Kalthoff et al. | 345/173 |
| 6,538,706 | B2 * | 3/2003 | Sun | 349/12 |
| 2005/0017956 | A1 | 1/2005 | Mai | |

FOREIGN PATENT DOCUMENTS

TW    200632753 A    9/2006

* cited by examiner

*Primary Examiner* — Nabil Z Hindi
(74) *Attorney, Agent, or Firm* — Altis Law Group, Inc.

(57) ABSTRACT

A touch panel includes a first conductive coating (23), a second conductive coating (24), a first wire (L1), a second wire (L2), a third wire (L3), a first switch element (233), and a second switch element (243). The first and second conductive coatings are opposite to each other. The first wire is electrically connected to a left edge of the first conductive coating. The second wire is electrically connected to a right edge of the first conductive coating via the first switch element, and is connected to a lower edge of the second conductive coating via the second switch element. The third wire is electrically connected to an upper edge of the second conductive coating. A method of driving the touch panel and a display utilizing the touch panel are also provided.

20 Claims, 4 Drawing Sheets

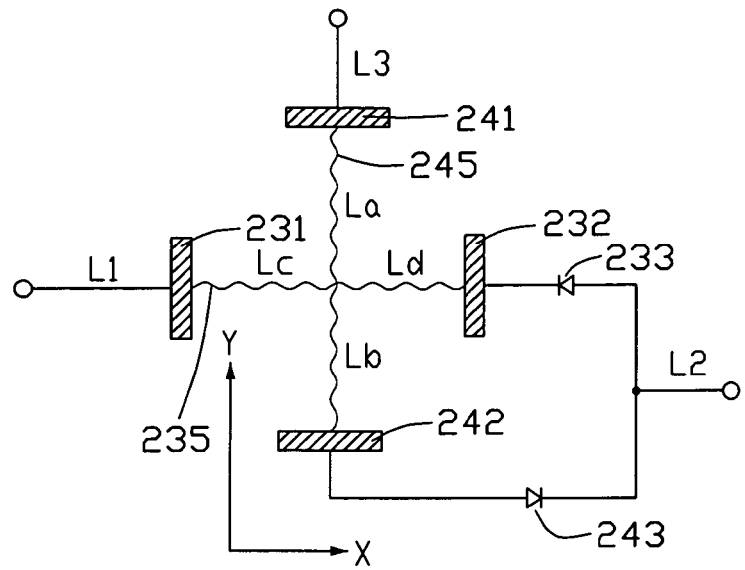

FIG. 3

| applying a first voltage difference between the first and second electrode bars of the first conductive coating | S1 |

| detecting a voltage of a connected point of the first and second conductive coatings, and confirming a first coordinate of the connected point | S2 |

| applying a second voltage difference between the third and fourth electrode bars of the second conductive coating | S3 |

| detecting a voltage of the connected point of the first and second conductive coatings, and confirming a second coordinate of the connected point | S4 |

FIG. 4

TOUCH PANEL, METHOD FOR DRIVING SAME, AND DISPLAY DEVICE USING THE SAME

FIELD OF THE DISCLOSURE

The present invention relates to touch panels, and more particularly to a 3-wire touch panel, a method for driving the 3-wire touch panel, and a display device employing the 3-wire touch panel.

BACKGROUND

Touch panels are transparent or opaque input devices for computers and other electronic systems. As the name suggests, touch panels are activated by contact from a user's finger, a stylus, or other devices. Transparent touch panels are generally layered over display devices, such as cathode ray tube (CRT) monitors and LCDs, to create display devices. These display devices are increasingly used in commercial applications such as restaurant order entry systems, industrial process control applications, interactive museum exhibits, public information kiosks, pagers, cellular phones, personal digital assistants (PDAs), video games, and the like.

The dominant touch panel technologies presently in use are resistive, capacitive, infrared, and acoustic touch panels. FIG. 7 is a cross-section of a conventional display device employing a resistive touch panel. The display device 1 includes a flat panel display (FPD) 16 and a touch panel 10 attached on a display surface 160 of the FPD 16 via an adhesive material 18.

The touch panel 10 is a resistive touch panel, which includes a first substrate 11 and a second substrate 12 opposite thereto. A first conductive coating 13 and a second conductive coating 14 are respectively applied on inner surfaces of the first and the second substrates 11, 12. An adhesive 15 is arranged at peripheral areas of the first and the second conductive coatings 13, 14 adhering them together. A plurality of spacers 17 are applied between the first and second conductive coatings 13, 14, separating the first and second conductive coatings 13, 14, and avoiding electrical contract therebetween unless the touch panel 10 is contacted.

FIG. 8 is a top plan view of the first and second conductive coatings 13, 14. The first conductive coating 13 includes a plurality of first resistance lines 131 arranged along an X-axis of a rectangular Cartesian coordinate system, first and second electrode bars E1, E2 disposed at the left and right ends of the first resistance lines 131, and a pair of wires X1, X2 connected to the first and second electrode bars E1, E2, respectively. The second conductive coating 14 has a structure similar to the first conductive coating 13. However, a plurality of resistance lines 141 are arranged along a Y-axis, third and fourth electrode bars E3, E4 are disposed at the upper and lower ends of the second resistance lines 141, and a pair of wires Y1, Y2 are connected to the third and fourth electrode bars E3, E4, respectively.

In operation, a voltage difference is applied to the pair of wires X1, X2, and voltage gradients are generated on the first resistance lines 131. Using the wire Y1 as a grounding wire, a voltage of a point corresponding to the first resistance lines 131 where a contact occurs can be detected by the wire Y1. Then an X-coordinate of the contact point can be determined by an analyzing circuit (not shown) according to the detected voltage level. In a similar manner, application of a voltage deference to the pair of wires Y1, Y2, and detecting a voltage of the contact point via the wire X1, a Y-coordinate of the contact point can be confirmed.

In the 4-wire resistive touch panel 10, the four wires X1, X2, Y1, Y2 apply voltage signals to the first and second conductive coatings 13, 14, respectively, detecting voltage signals of the contact point. However, such 4-wire resistive touch panel has a relatively complex driving method, and requires that the analyzing circuit has the same number of driving wires corresponding to the four wires X1, X2, Y1, Y2. Thus, the touch panel and corresponding analyzing circuit have complex circuit structures.

Accordingly, what is needed is a touch panel which can overcome the limitations described.

SUMMARY

In one aspect, a touch panel includes first and second opposite conductive coatings, a first wire electrically connected to a left edge of the first conductive coating, a second wire electrically connected to a right edge of the first conductive coating via a first switch element and connected to a lower edge of the second conductive coating via a second switch element, and a third wire electrically connected to an upper edge of the second conductive coating. A method of driving the touch panel, and a display device utilizing the touch panel are further provided.

Other novel features and advantages will become more apparent from the following detailed description when taken in conjunction with the accompanying drawings. In the drawings, all the views are schematic.

BRIEF DESCRIPTION OF THE DRAWINGS

FIG. 3 is a simplified circuit diagram of the touch panel.

FIG. 4 is a flowchart summarizing a detailed method for driving the touch panel and conforming the coordinates when a contact occurs.

DETAILED DESCRIPTION OF PREFERRED EMBODIMENTS

Reference will now be made to the drawings to describe various embodiments of the present disclosure in detail.

Figure 1:
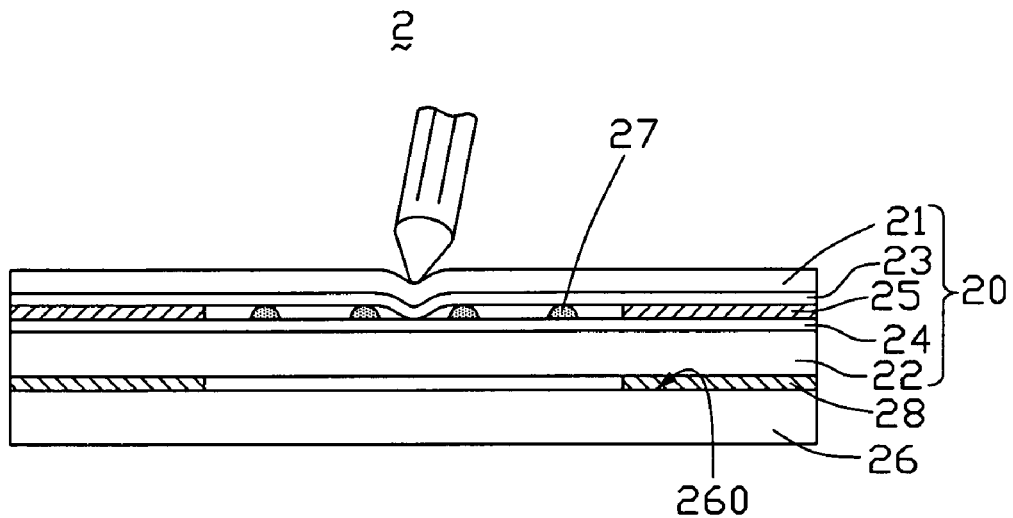
FIG. 1 is a cross-section of one embodiment of a display device according to the present disclosure, the touch display including a touch panel having first and second conductive coatings.

FIG. 1 is a cross-section of an embodiment of a touch panel according to the present disclosure, applied for use with a display device 2, which includes a flat panel display (FPD) 26 such as an LCD or plasma display panel (PDP), and the touch panel 20. The FPD 26 has a display surface 260. The touch panel 20 is arranged on the display surface 260 via a sealant 28 at the peripheral area therebetween.

The touch panel 20 is a resistive touch panel, which includes a first substrate 21 and a second substrate 22 generally opposite thereto. A first conductive coating 23 and a second conductive coating 24 are respectively applied on inner surfaces of the first and the second substrates 21, 22. An adhesive 25 is applied at peripheral areas of the first and the second conductive coatings 23, 24 adhering them together. A plurality of spacers 27 are applied between the first and second conductive coatings 23, 24, providing separation and avoiding electrical contact therebetween unless the touch panel 20 is contacted.

Figure 2:
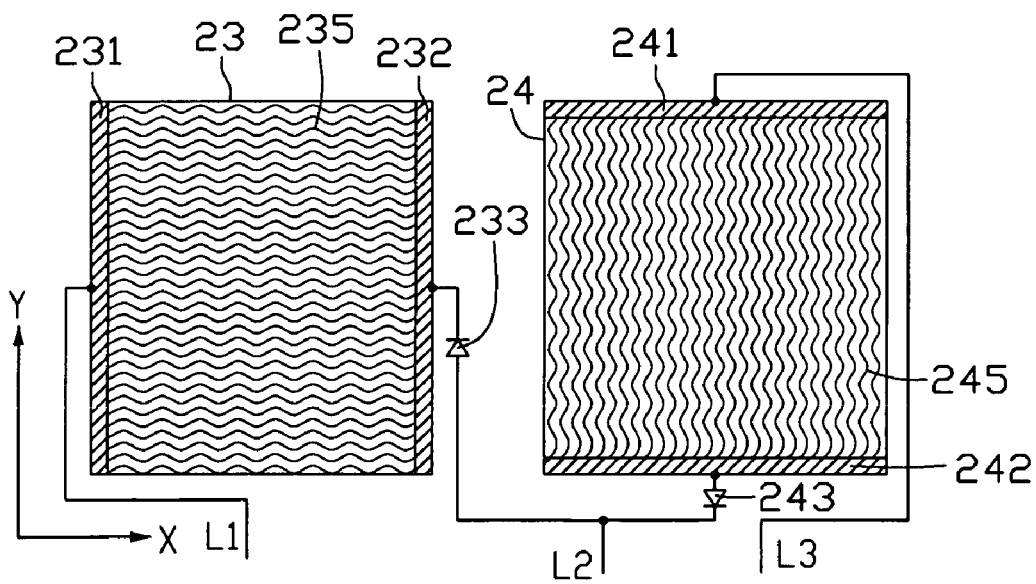
FIG. 2 is an abbreviated top plan view of the first and second conductive coatings of the touch panel of FIG. 1.

Also referring to FIG. 2, an abbreviated top plan view of the first and second conductive coatings 23, 24, the first conductive coating 23 includes a main body (not labeled), and first and second electrode bars 231, 232. The main body includes a plurality of uniform first resistance lines 235 arranged along an X-axis of a rectangular Cartesian coordinate system. The first and second electrode bars 231, 232 are disposed at and electrically connected to the left and right ends of the first resistance lines 235, respectively. The second conductive coating 24 has a structure similar to the first conductive coating 23. A plurality of second resistance lines 245 are arranged along a Y-axis, with third and fourth electrode bars 241, 242 disposed at and electrically connected to the upper and lower ends of the resistance lines, respectively.

The first and second resistance lines 235, 245 are made of transparent conductive material with uniform resistivity, so that a resistance of each of the first and second resistance lines 235, 245 is proportional to a length thereof. The first and second resistance lines 235, 245 can be indium tin oxide (ITO) film. The four electrode bars 231, 232, 241, 242 are conductive material with low resistivity, such as silver or copper. Thereby, attenuation of electrical signals transmitted by the electrode bars 231, 232, 241, 242 282 can be as low as possible.

Furthermore, a first wire L1 is connected to the first electrode bar 231 at a center portion thereof. A second wire L2 is connected to a center portion of the second electrode bar 232 forward through a first diode 233. The second wire L2 is also connected to a center portion of the fourth electrode bar 241 backward through a second diode 243. The first and second diodes 233, 243 function as switch elements. A third wire L3 is connected to the third electrode bar 241 at a center portion thereof.

FIG. 3 is a simplified circuit diagram of the touch panel 20. In operation, voltage signals are applied to the first, second, and third wires L1, L2, L3, respectively. Thereby, voltage gradients can be generated at the first and second resistance lines 235, 245. When a contact is applied to the surface of the touch panel 20, the first substrate 21 is pressed and bent towards the second substrate 22, such that the first and second conductive coatings 23, 24 are electrically connected at the contact point (as shown in FIG. 1). By detecting voltages of the first and second resistance lines 235, 245 where the contact occurs, coordinates of the contact point can be confirmed. A detailed method for confirming the coordination follows.

FIG. 4 is a flowchart summarizing a detailed method for driving the touch panel 20 and conforming the coordinates when a contact occurs. The method includes: step S1, applying a first voltage difference between the first and second electrode bars of the first conductive coating; step S2, detecting a voltage of a connected point of the first and second conductive coatings, and confirming a first coordinate of the connected point; step S3, applying a second voltage difference between the third and fourth electrode bars of the second conductive coating; and step S4, detecting a voltage of the connected point of the first and second conductive coatings, and confirming a second coordinate of the connected point.

Figure 5:
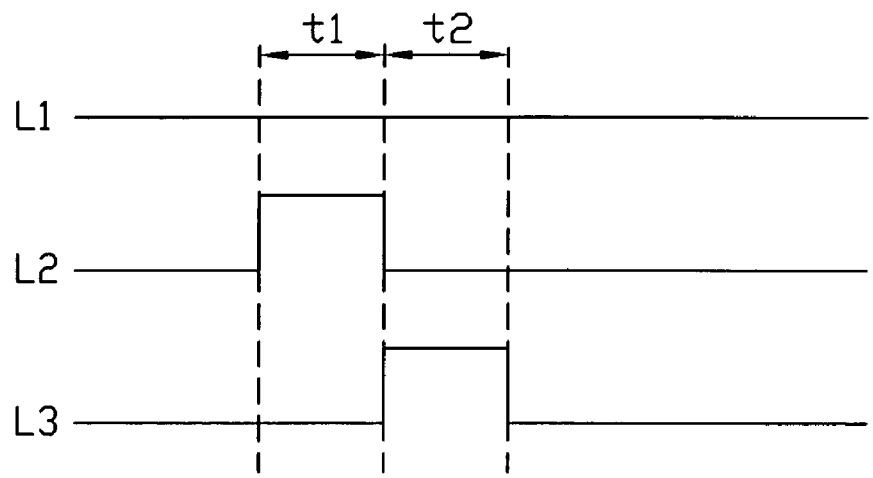
FIG. 5 shows waveforms of voltage signals applied to one embodiment of the touch panel.

FIG. 5 shows waveforms of voltage signals applied to the three wires L1, L2, L3, respectively. In a first time period t1, a constant low level voltage is applied to the first wire L1, a high level voltage is applied to the second wire L2, and a low level voltage is applied to the third wire L3. Thus the first diode 233 is activated, and the high level voltage is supplied to the first resistance lines 235 via the first diode 233 and second electrode bar 232. A voltage gradient is generated along each first resistance line 235 from the right end to the left end. One of the first resistance lines 235, at which the contact occurs, is divided into two parts with lengths of La, Lb, respectively. The two parts La, Lb have resistances of Ra and Rb, respectively. A voltage level of the contact point is detected by a corresponding second resistance line 245 electrically connected to the first resistance line 235. The detected voltage can be expressed according to the following formula (1):

$$(U2-U1)/(U1-U0)=Ra/Rb \quad (1)$$

Where U0 represents the low level voltage applied to the first wire L1, U1 represents the detected voltage of the contact point, and U2 represents the high level voltage applied to the second wire L2.

Because of the proportional relation between the resistance and the length of the first resistance line 235, the resistances Ra and Rb can be expressed according to the following formula (2):

$$Ra/Rb=La/Lb \quad (2)$$

Thus La/Lb can be expressed according to the following formula (3):

$$La/Lb=(U2-U1)/(U1-U0) \quad (3)$$

The voltages U0, U2 are predetermined, and by detecting the voltage U1 and according to formula (3), a result of La/Lb is obtained. According to the result of La/Lb, a location of the contact point along the first resistance line 235 can be determined. That is, an X-coordinate of the contact point can be obtained.

In a next time period t2, the constant low level voltage applied to the first wire L1 continues, the high level voltage applied to the second wire L2 degrades to a low level voltage, and the low level voltage applied to the third wire L2 rises to a high level voltage. Thus the first diode 233 is deactivated and the second diode 243 is activated. Accordingly the high level voltage is supplied to the second resistance lines 245 via the third electrode bar 241. A voltage gradient is generated along each second resistance line 245 from the upper end to the lower end. One of the second resistance lines 245, at which the contact occurs, is divided into two parts with lengths of Lc, Ld, respectively. The two parts Lc, Ld have resistances of Rc and Rd, respectively. A voltage of the contact point is detected by a corresponding first resistance line 235.

According to the above-described confirmation of the X-coordinate of the contact point, a similar formula (4) can be obtained:

$$Lc/Ld=(U3-U1)/(U1-U0) \quad (4)$$

Where U0 represents the low level voltage applied to the second wire L2, U1 represents the detected voltage of the contact point detected by a corresponding first resistance line 235, and U3 represents the high level voltage applied to the third wire L3.

The voltages U0, U3 are predetermined, and by detecting the voltage U1 and according to the above formula (4), a result of La/Lb is obtained, and accordingly obtaining a Y-coordinate of the contact point.

By the above-described method, precise coordinates (X, Y) of the contact point are obtained.

In the described touch panel 20, the first diode 233 and the second diode 243 are employed as switching elements, only three wires L1, L2, L3 are needed for applying driving voltage signals to the first and second conductive coating 23, 24. Thus, corresponding to the three wires L1, L2, L3, only three driving signals are needed for driving the touch panel 20. Accordingly, a relatively simplified method for driving the touch panel 20 is achieved.

Figure 6:
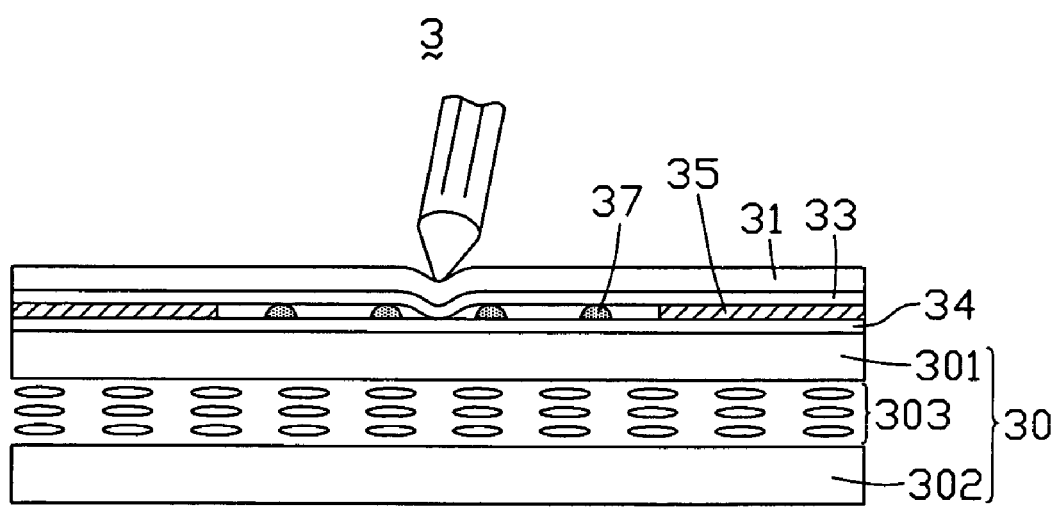
FIG. 6 is a cross-section of a display device of another embodiment according to the present disclosure.
Figure 7:
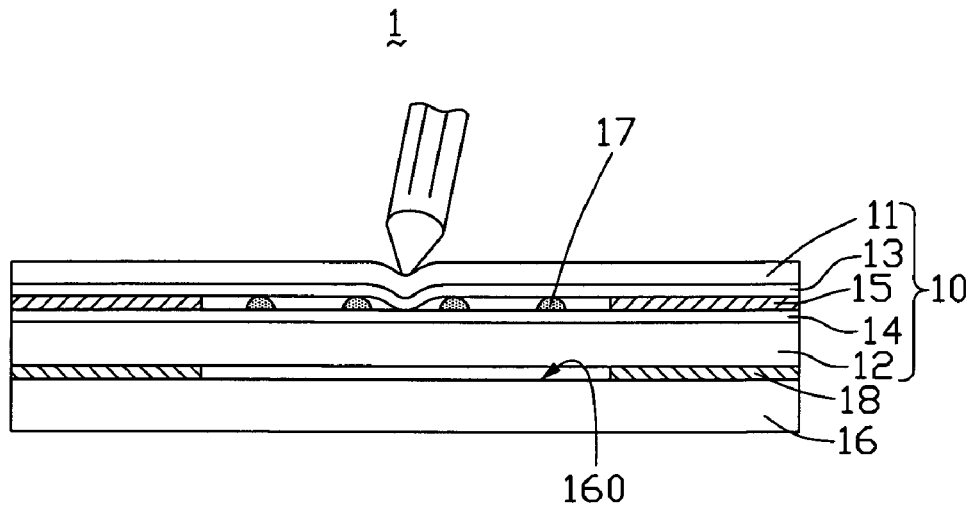
FIG. 7 is a cross-section of a conventional display device employing a resistive touch panel, the resistive touch panel including first and second conductive coatings.
Figure 8:
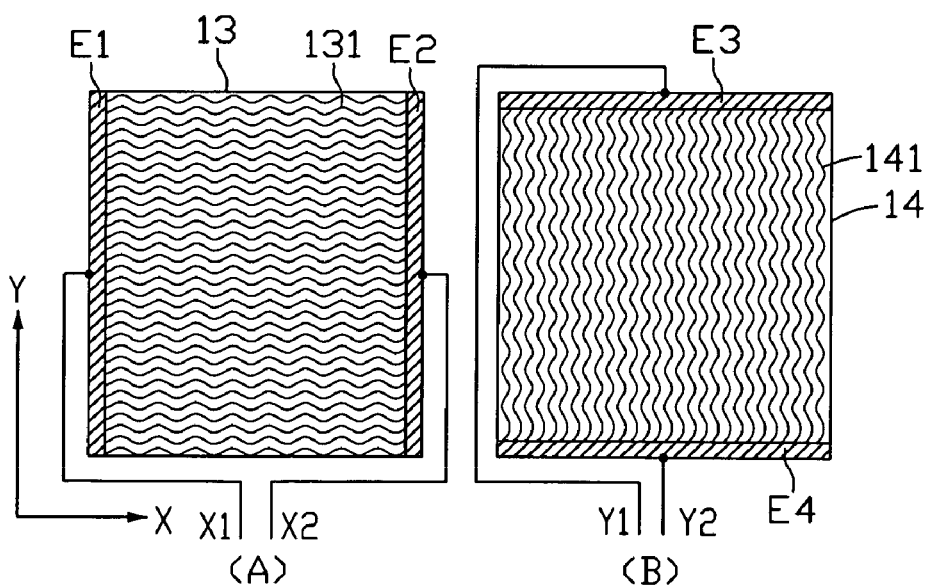
FIG. 8 is an abbreviated top plan view of the first and second conductive coatings of the resistive touch panel.

Referring to FIG. 6, a cross-section of a display device of an embodiment of the present disclosure is shown. The display device 3 has a structure similar to that of the display device 2, but further includes an LCD panel 30 and a touch panel (not labeled). The LCD panel 30 includes an upper substrate 301, a lower substrate 302, and a liquid crystal layer 303 interposed between the upper and lower substrates 301, 302. The touch panel is integrated with the LCD panel 30, sharing the upper substrate 301 of the LCD panel 30 as a second substrate. A second conductive coating 34 is formed on an upper surface of the upper substrate 301. The touch panel further includes a first substrate 31 opposite to the upper substrate 301, and a first conductive coating 33 formed on an inner surface of the first substrate 31. An adhesive 35 is applied at peripheral areas of the first and the second conductive coatings 33, 34 adhering them together. A plurality of spacers 37 are applied between the first and second conductive coatings 33, 34, providing separation and avoiding electrical contact therebetween unless the touch panel is contacted. The touch panel has a structure similar to that of the touch panel 20 of FIG. 1, and a method for driving the touch panel is the same as well.

In the display device 3, the touch panel and the LCD panel 30 share the upper substrate 301. Thus an overall thickness of the display device is further decreased.

It is to be understood, however, that even though numerous characteristics and advantages of the present embodiments have been set out in the foregoing description, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A touch panel, comprising:
   first and second conductive coatings opposite to each other;
   a first wire electrically connected to a left edge of the first conductive coating;
   a second wire electrically connected to a right edge of the first conductive coating via a first switch element, and connected to a lower edge of the second conductive coating via a second switch element; and
   a third wire electrically connected to an upper edge of the second conductive coating.

2. The touch panel of claim 1, wherein the first switch element is a first diode, a cathode of the first diode is electrically connected to the right edge of the first conductive coating, and an anode of the first diode is electrically connected to the second wire.

3. The touch panel of claim 2, wherein the second switch element is a second diode, an anode of the second diode is electrically connected to the right edge of the first conductive coating, and a cathode of the second diode is electrically connected to the second wire.

4. The touch panel of claim 3, wherein the first conductive coating comprises a main body, a first electrode bar electrically connected to a left end of the main body, and a second electrode bar electrically connected to a right end of the main body.

5. The touch panel of claim 4, wherein the main body comprises a plurality of first resistance lines extending along a first axis, two ends of each first resistance line electrically connected to the first and second electrode bars, respectively.

6. The touch panel of claim 4, wherein the cathode of the second diode is electrically connected to second electrode bar.

7. The touch panel of claim 3, wherein the second conductive coating comprises a main body, a third electrode bar electrically connected to an upper end of the main body, and a fourth electrode bar electrically connected to a lower end of the main body.

8. The touch panel of claim 7, wherein the main body comprises a plurality of second resistance lines extending along a second axis perpendicular to the first axis, and two ends of each second resistance line are electrically connected to the third and fourth electrode bars, respectively.

9. The touch panel of claim 7, wherein the anode of second diode is electrically connected to the second electrode bar.

10. The touch panel of claim 1, further comprising a first substrate and a second substrate, the first conductive coating arranged at the first substrate and the second conductive coating arranged at the second substrate.

11. The touch panel of claim 7, further comprising a plurality of spacers arranged between the first and second conductive coatings.

12. The touch panel of claim 8, wherein a resistance of each of the resistance lines is proportional to a length thereof.

13. A method for driving a touch panel of claim 1, comprising:
   applying a first voltage difference between the left edge and the right edge of the first conductive coating;
   detecting a voltage of a connected point of the first and second conductive coatings and confirming a first coordinate of the connected point according to the detected voltage;
   applying a second voltage difference between the upper and lower edges of the second conductive coating; and
   detecting a voltage of the connected point of the first and second conductive coatings, and confirming a second coordinate of the connected point according to the detected voltage.

14. The method of claim 13, wherein when the first voltage difference is applied, the first switch element is activated.

15. The method of claim 13, wherein when the second voltage difference is applied, the second switch element is activated.

16. The method of claim 13, wherein the first voltage difference is applied via the first and second wires.

17. The method of claim 13, wherein the second voltage difference is applied via the second and third wires.

18. A display device, comprising:
   a display device with a display surface; and
   a touch panel arranged at the display surface of the display device,
   wherein the touch panel comprises:
      first and second conductive layers opposite to each other;
      a first wire electrically connected to a first edge of the first conductive layer;

a second wire electrically connected to a second edge of the first conductive layer via a first switch element, and connected to a third edge of the second conductive layer via a second switch element, the second edge being opposite to the first edge, the third edge being adjacent to the first edge; and a third wire electrically connected to a fourth edge of the second conductive layer, the fourth edge being opposite to the third edge.

19. The display device of claim 18, wherein the second conductive layer of the touch panel is formed on the display surface of the display device.

20. The display device of claim 18, wherein the touch panel further comprises a substrate, the second conductive layer is formed on the substrate, and the substrate is arranged on the display surface of the display device.

* * * * *